(12) United States Patent
Sikkink et al.

(10) Patent No.: US 6,920,526 B1
(45) Date of Patent: Jul. 19, 2005

(54) DUAL-BANK FIFO FOR SYNCHRONIZATION OF READ DATA IN DDR SDRAM

(75) Inventors: Mark Ronald Sikkink, Chippewa Falls, WI (US); Nan Ma, Chippewa Falls, WI (US)

(73) Assignee: Silicon Graphics, Inc., Mountain View, CA (US)

( * ) Notice: Subject to any disclaimer, the term of this patent is extended or adjusted under 35 U.S.C. 154(b) by 673 days.

(21) Appl. No.: 09/619,771

(22) Filed: Jul. 20, 2000

(51) Int. Cl.[7] .............................................. G06F 12/06
(52) U.S. Cl. ........................... 711/109; 711/150; 711/5; 711/132; 710/52; 710/38; 710/53; 710/56; 710/61
(58) Field of Search .............................. 710/36, 39, 29, 710/31, 33, 52, 38, 53, 56, 58, 61; 711/109, 150, 5, 119, 129, 131, 132, 148

(56) References Cited

U.S. PATENT DOCUMENTS

| | | | | |
|---|---|---|---|---|
| 5,371,877 A | * | 12/1994 | Drako et al. | 711/109 |
| 5,615,355 A | * | 3/1997 | Wagner | 711/167 |
| 5,699,530 A | * | 12/1997 | Rust et al. | 711/150 |
| 6,078,336 A | * | 6/2000 | Reynolds | 345/558 |
| 6,150,679 A | * | 11/2000 | Reynolds | 257/213 |
| 6,434,674 B1 | * | 8/2002 | DeWilde et al. | 711/149 |

FOREIGN PATENT DOCUMENTS

| | | | |
|---|---|---|---|
| DE | 3137292 A1 | * | 5/1982 |
| JP | 06052328 A | * | 2/1994 |
| JP | 08077096 A | * | 3/1996 |
| JP | 2000010759 A | * | 1/2000 |
| JP | 2001290757 A | * | 10/2001 |

* cited by examiner

*Primary Examiner*—B. James Peikari
(74) *Attorney, Agent, or Firm*—Schwegman, Lundberg, Woessner & Kluth, P.A.

(57) ABSTRACT

The present invention comprises a dual bank FIFO memory buffer operable to buffer read data from memory and thereby compensate for specific timing problems in certain computerized systems. One embodiment of the invention includes a dual bank FIFO that comprises a first bank of memory elements operable to buffer memory data and a second bank of memory elements operable to buffer memory data. Write control address logic is operable to store selected memory data in memory elements with selected addresses within a bank of memory elements, and write control timing logic is operable to selectively grant write access to the banks of memory elements at predetermined time. Also, read control logic operable to read data stored in the first and second banks.

27 Claims, 2 Drawing Sheets

US 6,920,526 B1

DUAL-BANK FIFO FOR SYNCHRONIZATION OF READ DATA IN DDR SDRAM

FIELD OF THE INVENTION

The invention relates generally to a method of accessing computer memory, and more specifically to use of a dual-bank first-in-first-out (FIFO) for synchronization of read data in double-data-rate (DDR) synchronous dynamic random access memory (SDRAM).

BACKGROUND OF THE INVENTION

Data from DDR SDRAM memory typically arrives at the inputs of a receiving device both on the rising and falling edges of a clock, along with a phase-shifted strobe signal. Such a strobe begins with a logical low signal level for one memory clock period called the preamble, and a predetermined number of tandem rising and falling edges occur followed by a half-clock period postamble that is also a logical low signal. The strobe then enters an undefined (tristate) phase. The strobe's rising and falling edges between the preamble and postamble are deterministically centered in the data windows of the received data.

The strobe must be enabled during the preamble phase and not before to prevent capturing noise or other false data as received memory data, and must also be enabled in time to ensure the first rising edge corresponds to arrival of the first data symbol to properly capture the arriving data. Because the data from the DDR SDRAM is provided from memory that is often operating at a very high clock rate and that is not physically proximate to the memory controller, read loop delay can be substantial. Factors comprising or contributing to read loop delay include silicon or propagation delay in communicating data from silicon devices to the interconnect level, interconnect propagation delay between the memory semiconductor to the memory controller, PLL jitter, DRAM DLL uncertainty, and other factors. Delay can also be affected by the number of DIMMs per memory channel in large systems, and by physical factors such as silicon process, interconnect design, voltage, temperature, etc. These factors can cause the read loop delays to exceed one clock cycle, and in some cases can also cause the difference between minimum and maximum read loop delays in a system to exceed a full clock cycle.

Because DDR SDRAM strobes are undefined during certain phases before and after data bursts and because the read loop delay can exceed one clock period, data synchronization with the memory controller can become difficult. This problem becomes increasingly important as faster memory is utilized, especially with DDR SDRAM memory channels that are fully populated with four DIMMs per channel.

Solutions have included placing all DDR SDRAM memory physically close to the memory controller, which typically is also near the processor bus and other data channels and so must compete for space. Alternatively, memory can be located away from the memory controller, with additional PCB trace padding for memory that is nearer the controller to ensure that all memory read loop delays are within one clock cycle of each other. But, this solution requires additional substantial PCB traces, which again is expensive and makes circuit board layout complex and inefficient. More common is simply limiting the window between maximum and minimum read loop delays to a single clock cycle by reducing the DIMM count per channel, limiting memory clock frequency, or limiting the number of memory channels per memory controller device.

SUMMARY OF THE INVENTION

The present invention comprises a dual bank FIFO memory buffer operable to buffer read data from memory and thereby compensate for some types of timing problems in certain computerized systems. One embodiment of the invention includes a dual bank FIFO that comprises a first bank of memory elements operable to buffer memory data and a second bank of memory elements operable to buffer memory data Write control address logic is operable to store selected memory data in memory elements with selected addresses within a bank of memory elements, and write control timing logic is operable to selectively grant write access to the banks of memory elements at predetermined time. Also, read control logic is operable to read data stored in the first and second banks.

DETAILED DESCRIPTION

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

As explained earlier, in some types of memory systems such as DDR SDRAM memory systems, strobes are undefined during certain phases before and after data bursts and the read loop delay can exceed one clock period. This can result in reception of invalid data due to lack of data synchronization between the memory and the memory controller. The present invention provides an architecture and method providing the ability to avoid these timing issues and provide an operable DDR SDRAM system with relatively substantial read loop delay.

Figure 1:
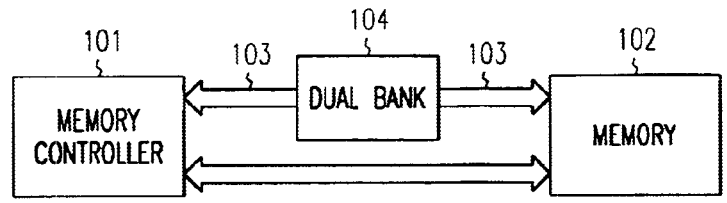
FIG. 1 shows a memory system, consistent with an embodiment of the present invention.

FIG. 1 illustrates a system with a memory controller 101 connected to a memory 102. The connections between the memory controller and the memory include a data channel 103 operable to convey requested data from the memory to the memory controller. In some embodiments of the invention, a dual-bank FIFO 104 is connected between the memory controller and the memory on the data channel 103, and is operable to buffer data as is explained in greater detail herein.

Figure 2:
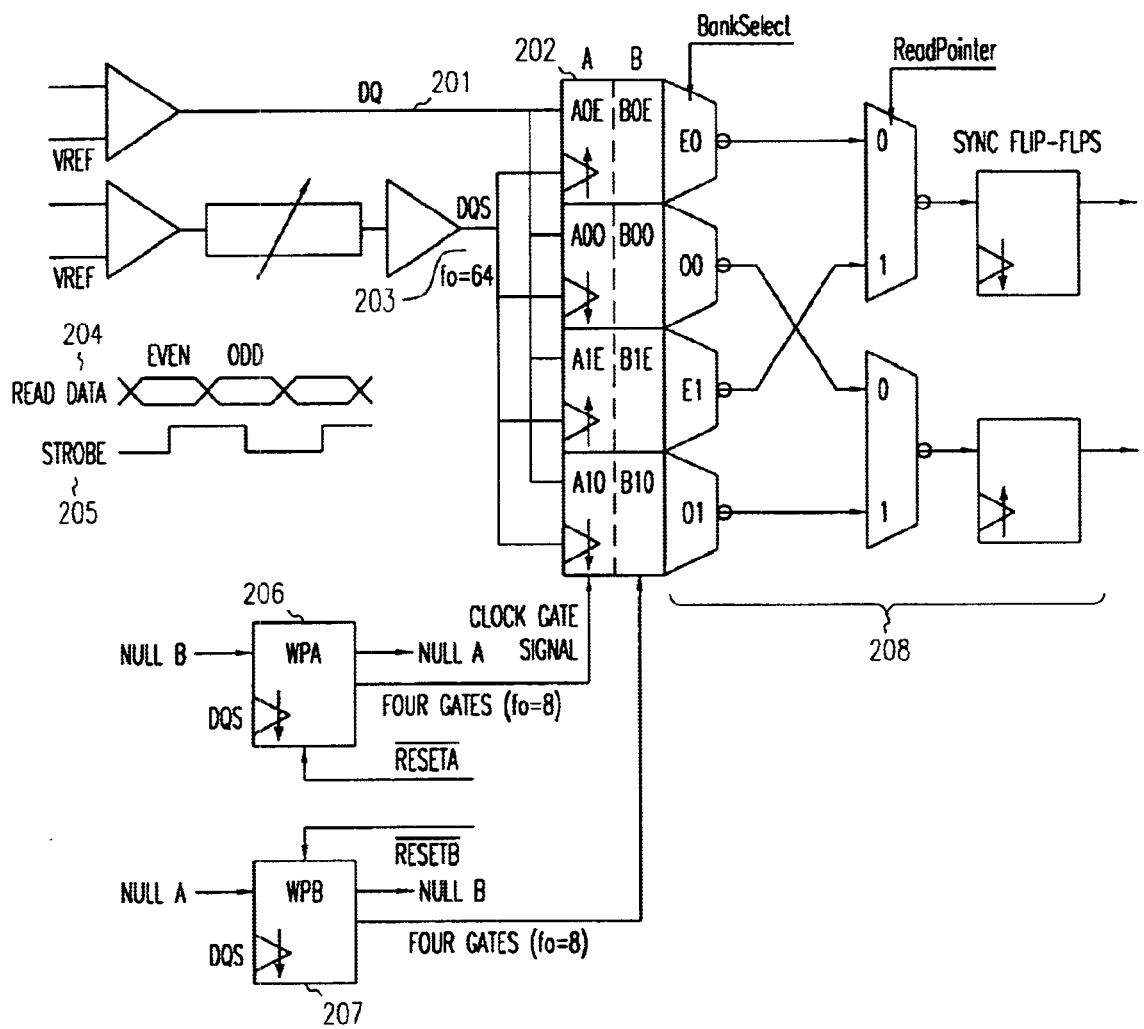
FIG. 2 shows a dual-bank FIFO, consistent with an embodiment of the present invention.

FIG. 2 illustrates one example embodiment of a dual-bank FIFO as is shown at 104 in FIG. 1. In the example shown here, a dual-bank FIFO is configured to receive eight bits of data as shown at 204 via data input DQ 201. The read data is stored in two banks of memory elements shown at 202. The banks of memory elements here are divided into bank "A" and bank "B" for reference. A data strobe signal as shown at 205 is received at 203, and distributed to the memory elements.

Each bank of memory elements in this example is further divided into either even or odd memory elements, and into address 0 or address 1. This enables accessing four elements per bank, including both even and odd elements for each address. Even data is defined as shown at 204 and 205 as data that is received during a rising edge of the strobe signal 205, and odd data is data that is received during a falling edge. For example, the first memory element in bank A is labeled A0E for bank A, address 0, even element. Other memory elements shown at 202 are similarly labeled.

Incoming data is stored in a specific element not only based on determination of whether the data is odd or even, but is further dependent in the example shown here on cycling of the address after each full clock cycle and on selection of a bank by write pointer A at 206 and write pointer B at 207. The operation of the write pointers ensures that data is stored only during times when the read data 201 is determined to be valid. Data stored in the memory elements 202 of the FIFO is then read by read logic 208.

Figure 3:
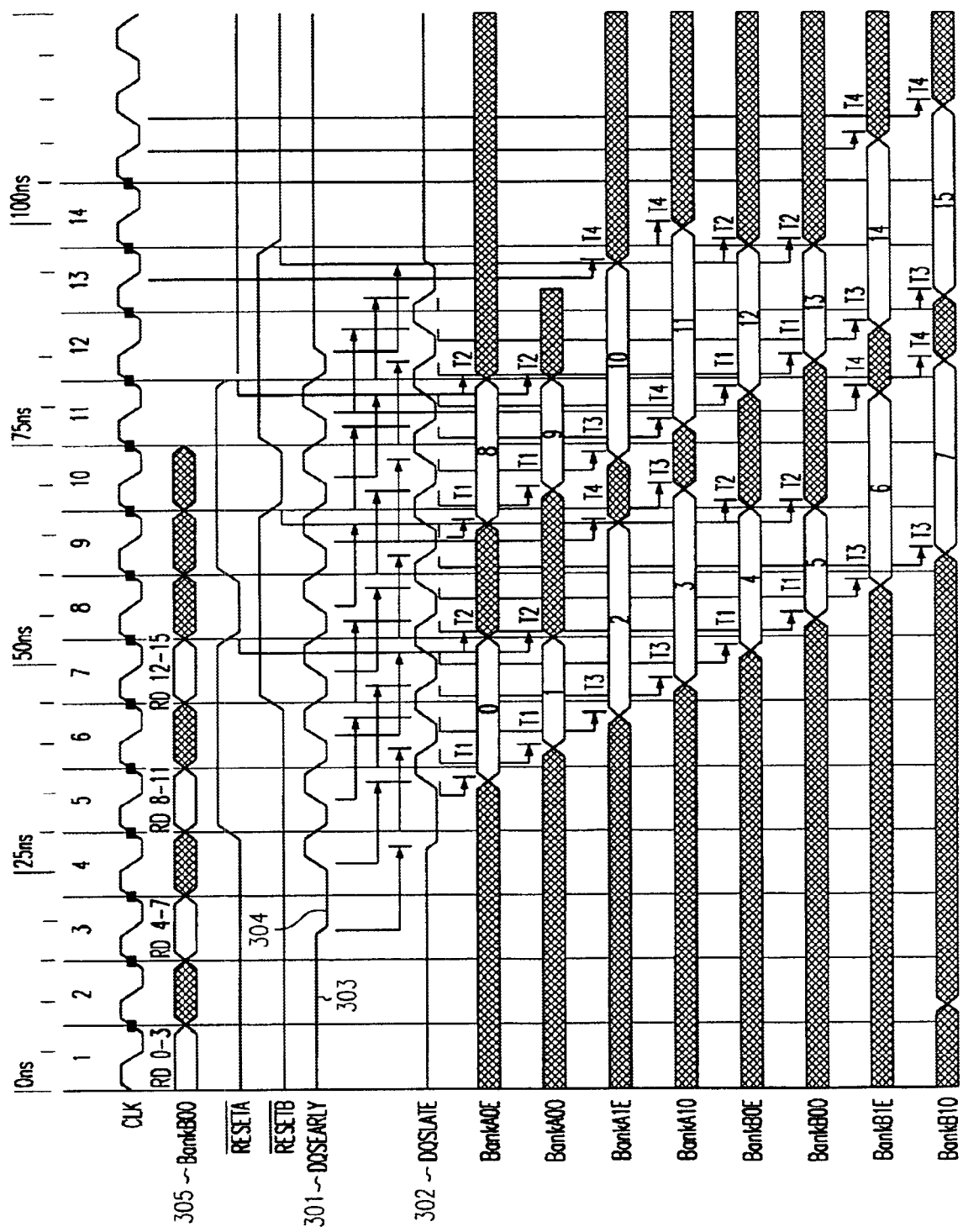
FIG. 3 is a timing diagram of various signals in an operational example of an embodiment of the present invention.

The operation of write pointer A at 206 and write pointer B at 207 in the example shown is dependent on not only the falling edge of the strobe signal 205 and receipt of a null signal from the other pointer, but also on receiving a reset signal in a write pointer as is shown at 206 and 207. The reset A signal first is generated to enable filling bank A with data first, and goes high only after a preamble section of the strobe signal starts but before or coincident with the first falling edge of the strobe signal. FIG. 3 shows an early strobe signal at 301 representing an earliest possible strobe signal timing and a late strobe signal 302 representing the latest possible strobe signal timing. The preamble portion of early strobe signal 301 is shown at 304, and occurs immediately after the strobe changes from its tristate region 303.

To understand how the timing of the reset A and reset B signals and the other signals interact, certain definitions or assumptions must be defined in greater detail with respect to this example embodiment.

At the FIFO input, data and clock (or strobe) are transmitted together with a precise phase relationship (source synchronous). Upon arrival at the FIFO input, strobe lags data, such that it is guaranteed to capture valid data into successive FIFO addresses. The strobe rising edges capture what has already been defined to be even data, while falling edges correspond to data that will be captured as odd data.

At the FIFO output, the receiving clock system retrieves read data from successive buffer addresses, during time windows where stable data is guaranteed. Skew is defined as the difference between the latest possible strobe arrival time and the earliest. The guaranteed stable data time window length is defined as the time span from the latest possible strobe arrival and data capture event to the next earliest write event to that same address. Therefore, the guaranteed data valid window is started by a late strobe capturing data into a FIFO address. The end of the window is defined by an early strobe writing again into that same address, after cycling through the other FIFO addresses. Therefore, the FIFO depth less strobe skew defines the window.

In DDR SDRAMs the source synchronous clock or strobe has an undefined tri-state region where noise causes random, unpredictable strobe events. It is this part of the data burst protocol which causes uncertainty in DDR read data receivers, especially in large, high performance memory systems, where loop delay and/or loop delay skew can be larger than a clock period.

The write pointer A is initially forced into state 0 by activating resetA, where rising strobe edges write even data into address 0 and falling strobe edges write odd data into address 0. The write pointer is held in this state until resetA is deactivated. The signal resetA is deactivated just prior to the earliest possible odd data capture event into address 0. At this time address 0's even data has already been captured. This effectively increases the preamble window to 1.5 clock periods. The signal resetA is held inactive for three clock periods, guaranteeing that the WP is enabled in cases where the latest possible data capture events exist, and is not reset prior to extracting address 0 data.

Deactivation of resetA is a system programmable event, that is based on SDRAM latency, and on electrical analysis of the read loop delay. It is programmed, such that the write pointer is either forced into state 0 or into the null state during the times that strobe is undefined.

As the odd data is captured into address 0 on the strobe falling edge, the write pointer A is simultaneously incremented to state 1. Next, even and odd data are captured in address 1 by strobe rising and falling edges, completing the burst of four capture process. Simultaneous with capture of the last odd data bit, WP is incremented into the null state. In this state, strobe events are ignored, guaranteeing that after the postamble period ends the FIFO data will remain valid.

Dual Bank Write Pointer Operation: If another burst of four is requested from memory, the other bank is used (always toggle between banks) and the process repeats. If requests to memory are spaced at minimum intervals, then the multiple data bursts are concatenated into longer bursts, and the postamble period is held off until the end of the contiguous complex burst. As the extended burst streams into the FIFO, capture alternates between bank A and bank B of the dual bank FIFO. Valid data is extracted from a FIFO bank after the latest possible arrival of that data, and before the next write to that bank. The extraction algorithm executed via read logic 208 allows for proper bank selection and address selection.

The reset signals resetA and resetB are system programmable events, based on CAS latency and analysis as described above. The signals resetA and resetB are programmed identically during the system power-up sequence. The signals resetA and resetB are decoded events (on memory controller) that occur whenever memory read data is requested. The decoder result brings resetA or resetB deactivated for one clock period. Signals resetA and resetB are then delayed by an amount of time, such that it deactivates just prior to the earliest possible odd data capture event into address 0 of the respective FIFO bank, as described earlier.

The signals resetA and resetB are elongated to a length of three clock periods. This time span guarantees that the write pointer reset is not reactivated prior to capturing the latest possible odd data bit, and guarantees a valid address 0 data window for extraction, as described earlier.

Additional write pointer control is required to handle concatenated bursts. When strobe arrival is considered early write pointer operation is as described above. When strobes pass through a boundary phase then race conditions exist, that must be resolved. When strobes arrive after the boundary phase then they shall be considered as late.

The signals resetA and resetB are always applied systematically without regard to actual strobe arrival times. In the late arriving strobe case, resetA deactivates after preamble starts and well in advance of data capture. In this case, resetB deactivates before the first burst of four is captured into bank A, resulting in duplicate data capture into each bank. The write pointer B for bank B falls into the null state earlier, missing valid data captures.

Therefore, the write pointer for bank B must be held up by the write pointer for bank A. Write pointer A does not allow write pointer B to begin state increments until after write pointer A is in the null state. Write pointer B delivers identical control to WP A. The transition time period, called the boundary phase, between what is considered early and late strobes, requires that resolution of race conditions within each write pointer for proper operation.

Implementation of a dual bank FIFO with unique and separate write pointer controls and with internal resolution of race conditions provides a complete solution to the DDR read loop timing problem.

Operationally, DQ[7:0] shown at 201 and DQS shown at 203 are "read data" and "strobe", respectively, representing one ×8 slice returning from the DDR SDRAM DIMM. Nine ×8 slices, in this example system's case, constructs one standard physical DIMM memory bank, which is 72 bits in width (memory channel). A single DQ then connects to each memory element, which in this case are flip-flops (8), in a dual bank FIFO. One dual bank FIFO is dedicated to each DQ, for a total of 72 FIFOs per memory channel.

DQS returns from memory with identical phase as DQ, but is delayed and fanned out to each FIFO element. The additional required phase shift on DQS is nominally 0.25 clock periods, centering DQS in the DQ valid window. Each DQS fans out to a total of 8 dual bank FIFOs (all DQ's within respective slice) or 64 clocked elements.

The FIFO is partitioned into two separate banks (A and B, as shown at 202), each with a separate associated write pointer. Within each bank there are two addressees (0 and 1). Each address holds two data fields, one for even data bits and one for odd data bits.

The write pointers are clocked on the negative edge of DQS, and are forced into state 0 by asynchronous resets, resetA and resetB prior to the strobe signal preamble. During this time DQS is unpredictable and noise can cause multiple false strobe events. The write pointers of both banks enable address 0 during this time, but the write pointers are held in state 0. Address 0 data becomes invalid. Previously written address 1 data is still valid.

A read request is delivered to the SDRAMs via the memory channel. One read loop delay period later the data and strobe(DQS) arrive at the FIFO input. The read loop delay comprises several segments: a 0.25 clock period phase shift on the controller; a clock flight time from the controller to the registered DIMM; one clock period from the register part to the SDRAM part; two, two and one-half, or three clock periods through the SDRAM(CAS latency); a DQS flight time back to the controller; and a 0.25 clock period DQS delay. Also, DQS is guaranteed low for one clock period (preamble) prior to the first valid rising edge.

Flight time delay variation, along with other component delay uncertainties, injects skew into the read loop delay. This skew is bounded by earliest and latest possible DQS arrival times at the FIFO input. Reset activation and de-activation times are based on knowledge of the read loop delay period.

The signals resetA and resetB are delayed based on knowledge of the read loop flight time. This delay is a programmable feature, and can in this example take on values from 4 to 5.75 clock periods in 0.25 clock period steps. The value is normally based on the DRAM CAS latency. It may also be used to facilitate windowing techniques.

During the preamble phase, the DQS strobe signal is forced low. No FIFO capture events occur during this time. Immediately after preamble the first valid DQS rising edge occurs, strobing a valid data bit into the even field of address 0. The resetA signal must be deactivated after the preamble starts, and before the first valid falling edge of the burst, defining a setup time (st). In the case of FIG. 2, resetA is deactivated four clock periods after a "read request". Next, a DQS strobe falling edge strobes a valid data bit into the odd field of address 0. Simultaneously, because resetA is inactive and bank B is inactive, DQS increments write pointer A to state 1. Write pointer B redundantly captures the same data into bank B, but remains in state 0. The next rising edge of the strobe signal DQS strobes a valid data bit into the even field of bank A's address 1. The next falling edge strobes a valid bit into the odd field of bank A's address 1, and simultaneously increments write pointer A into a null state. Write pointer B remains in state 0. Bank B's data in address 0 is equivalent to bank A's address 1.

While in the null state, neither address 0 nor address 1 is enabled, completely disabling write access to bank A. This protects bank A's contents from corruption after the postamble phase ends, or from subsequent writes to bank B if bursts are contiguous. A data valid window exists in bank A, during which time the data can be extracted from the FIFO.

The write pointer A remains in this null state until resetA is activated. When resetA is activated bank A's address 1 data remains valid, but address 0 becomes invalid. When resetA is activated, the transition from null to state 0 is guaranteed not to temporarily enable address 1. Write pointer A is now rearmed and waiting for the next burst cycle to bank A.

Burst captures alternate between bank A and bank B. Write pointer A and write pointer B function identically. The write pointers cross communicate their active or inactive status via the nullA and nullB signals, as shown at 206 and 207 of FIG. 2. A bank is active if its write pointer is not in the null state or if its reset is active. An active bank always holds up the other bank.

When the round trip flight time or the read loop delay period is equal to one clock period then the DQS strobe arrives between early and late conditions. This condition has been defined as a boundary phase. During this time hazardous race conditions exist internal to the write pointers. A race condition exists when resetA is activated simultaneously with a DQS falling edge. In these situations, resetA must force a low on nullA so that nullA will not glitch high, disturbing the operation of write pointer B during a DQS strobe falling edge. In this case a race would prevent write pointer B from incrementing to state 1 from state 0.

Another race conditions exists when resetA is de-activated simultaneously with a DQS strobe falling edge. When resetA is deactivated nullA will signify a busy bank A before nullB indicates an idle bank B. This way write pointer A is guaranteed to hold at state 0, and write pointer B increments from state 1 to null.

Two ranks of multiplexors are used in the read logic shown at 208 to extract data from the FIFO. The first multiplexor rank is used to select bank A or bank B. The second rank steers address 0 or address 1, to sync flip-flops. The multiplexor select inputs (BankSelect and ReadPointer) are set up in the clock period just prior to the valid FIFO sampling time.

Valid FIFO sample times are shown in the timing diagram in FIG. 3. The start of the valid sampling windows for each element of each bank are defined by late DQS arrivals. The end of the valid sampling windows are defined by application of resetA or resetB, in the case of address 0, or early DQS as in the case of address 1.

Windowing techniques can also be applied. First, all system delays in the read loop path period have been analyzed and understood. Based on this delay analysis, all read loop paths must be padded up to a guaranteed minimum delay, if necessary. Next, the proper programmable delay for resetA and resetB is set, such that the 1.5 clock period preamble window is properly targeted.

In this example and again referring to FIG. 3, the valid FIFO sample times have been determined to be six full strobe cycles after the beginning of the period in which the data was requested for even data, and seven full strobe cycles after for odd data. Reset A becomes set four full clock cycles after the initial read data command is issued (referring to the command CMD instruction line at 305), ensuring that resetA is set in or after the preamble but before the first falling edge (referring to early and late strobe lines 301 and 302).

Other embodiments of the invention exist that may differ substantially from the structure and function of the example embodiment described above. For example, a dual-bank FIFO may further comprise additional bans (more than two banks), and have additional write pointers associated with the other banks. Various configurations of FIFO buffers within memory systems, such as multiple buffers per channel, are also within the scope of the invention. Many more possible configurations exist, all of which are within the scope of the invention claimed here.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

What is claimed is:

1. A dual bank FIFO memory buffer, comprising:
   a first bank of memory elements operable to buffer memory data;
   a second bank of memory elements operable to buffer memory data;
   write control address logic operable to store selected memory data in memory elements with selected addresses;
   a first write pointer associated with the first bank of memory elements, the first write pointer operable to allow received data to be written to the first bank of memory elements when a second write pointer is in a null state;
   a second write pointer associated with the second bank of memory elements, the second write pointer operable to allow received data to be written to the second bank of memory elements when the first write pointer is in a null state;
   write control timing logic operable to selectively grant write access to the banks of memory elements at predetermined times by enabling the first and second write pointers at times dependent on received strobe signal preamble timing;
   read control logic operable to read data stored in the first and second banks;
   a first port connecting the dual bank FIFO memory buffer to a memory; and
   a second port connecting the dual bank FIFO memory buffer to a memory controller.

2. The dual bank FIFO memory buffer of claim 1, wherein the memory data is provided by double data rate synchronous dynamic read only memory (DDR SDRAM) operatively connected to the buffer via the first port.

3. The dual bank FIFO memory buffer of claim 1, wherein the write control address logic is operable to determine an element within a bank of memory elements in which selected memory data is to be stored by evaluating rising and falling edges of a strobe signal.

4. The dual bank FIFO memory buffer of claim 3, wherein the determination of the element in which selected memory data is to be stored further comprises selection of sequential element addresses during sequential strobe cycles.

5. The dual bank FIFO memory buffer of claim 1, wherein the write control timing logic comprises a write pointer associated with each FIFO bank.

6. The dual bank FIFO memory buffer of claim 5, wherein each write pointer is operable to control write access to its associated FIFO bank.

7. The dual bank FIFO memory buffer of claim 6, wherein write access is granted via write pointer only during predetermined time periods when the read data is determined to be valid.

8. The dual bank FIFO memory buffer of claim 7, wherein determination that the read data is valid comprises determination that a programmed expected time delay after issuing a read request has occurred.

9. The dual bank FIFO memory buffer of claim 8, wherein the programmed expected time delay is determined independently for different units of memory.

10. A memory controller, comprising:
    a command signal output operable to issue a data read command;
    a data input operable to receive read data from a memory; and
    a dual-bank FIFO connected between the data input and the memory and operable to buffer the read data, the dual-bank FIFO further comprising:
    a first bank of memory elements operable to buffer memory data;
    a second bank of memory elements operable to buffer memory data;
    write control address logic operable to store selected memory data in memory elements with selected addresses;
    a first write pointer associated with the first bank of memory elements, the first write pointer operable to allow received data to be written to the first bank of memory elements when a second write pointer is in a null state;
    a second write pointer associated with the second bank of memory elements, the second write pointer operable to allow received data to be written to the second bank of memory elements when the first write pointer is in a null state;
    write control timing logic operable to selectively grant write access to the banks of memory elements at predetermined times by enabling the first and second write pointers at times dependent on received strobe signal preamble timing; and read control logic operable to read data stored in the first and second banks.

11. The memory controller of claim 10, wherein the memory data is provided by double data rate synchronous dynamic read only memory (DDR SDRAM) operatively connected to the buffer.

12. The memory controller of claim 10, wherein the write control address logic is operable to determine an element within a bank of memory elements in which selected memory data is to be stored by evaluating rising and falling edges of a strobe signal.

13. The memory controller of claim 12, wherein the determination of the element in which selected memory data is to be stored further comprises selection of sequential element addresses during sequential strobe cycles.

14. The memory controller of claim 10, wherein the write control timing logic comprises a write pointer associated with each FIFO bank.

15. The memory controller of claim 14, wherein each write pointer is operable to control write access to its associated FIFO bank.

16. The memory controller of claim 15, wherein write access is granted via write pointer only during predetermined time periods when the read data is determined to be valid.

17. The memory controller of claim 16, wherein determination that the read data is valid comprises determination that a programmed expected time delay after issuing a read request has occurred.

18. A computerized information handling system, the system comprising:
   a memory controller;
   a memory;
   a processor; and
   a dual-bank FIFO connected between the memory and the memory controller and operable to buffer read data, the dual-bank FIFO further comprising:
      a first bank of memory elements operable to buffer memory data;
      a second bank of memory elements operable to buffer memory data;
      write control address logic operable to store selected memory data in memory elements with selected addresses;
      a first write pointer associated with the first bank of memory elements, the first write pointer operable to allow received data to be written to the first bank of memory elements when a second write pointer is in a null state;
      a second write pointer associated with the second bank of memory elements, the second write pointer operable to allow received data to be written to the second bank of memory elements when the first write pointer is in a null state;
      write control timing logic operable to selectively grant write access to the banks of memory elements at predetermined times by enabling the first and second write pointers at times dependent on received strobe signal preamble timing; and
      read control logic operable to read data stored in the first and second banks.

19. The dual bank FIFO memory buffer of claim 18, wherein the memory data is provided by double data rate synchronous dynamic read only memory (DDR SDRAM) operatively connected to the buffer.

20. The dual bank FIFO memory buffer of claim 18, wherein the write control address logic is operable to determine an element within a bank of memory elements in which selected memory data is to be stored by evaluating rising and falling edges of a strobe signal.

21. The dual bank FIFO memory buffer of claim 20, wherein the determination of the element in which selected memory data is to be stored further comprises selection of sequential element addresses during sequential strobe cycles.

22. The dual bank FIFO memory buffer of claim 18, wherein the write control timing logic comprises a write pointer associated with each FIFO bank.

23. The dual bank FIFO memory buffer of claim 22, wherein each write pointer is operable to control write access to its associated FIFO bank.

24. The dual bank FIFO memory buffer of claim 23, wherein write access is granted via write pointer only during predetermined time periods when the read data is determined to be valid.

25. The dual bank FIFO memory buffer of claim 24, wherein determination that the read data is valid comprises determination that a programmed expected time delay after issuing a read request has occurred.

26. The dual bank FIFO memory buffer of claim 25, wherein the programmed expected time delay is determined independently for different units of memory.

27. A method of compensating for potential read loop delay timing-induced read errors, comprising:
   selectively granting write access to a bank of FIFO buffer memory selected from a multi-bank FIFO of memory elements at determined time via write control timing logic, the write control timing logic comprising a write pointer associated with each FIFO bank and operable to control write access to the associated bank during periods when read data is determined to be valid, the multi-bank FIFO coupled between a memory and a memory controller.

* * * * *